Figure 1:
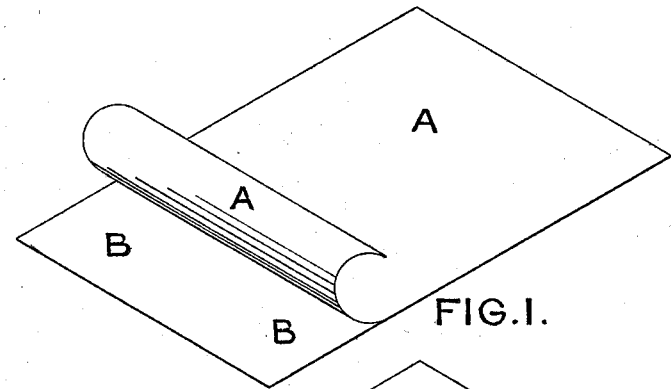

No. 647,540. Patented Apr. 17, 1900.
J. E. THORNTON & C. F. S. ROTHWELL.
POSITIVE PHOTOGRAPHIC FILM.
(Application filed July 31, 1899.)

(No Model.)

WITNESSES.
Joseph Bates.
E. Howard.

INVENTORS.
J. E. Thornton
C. F. S. Rothwell
by Dowden O'Brien
atty.

THE NORRIS PETERS CO., PHOTO-LITHO., WASHINGTON, D. C.

UNITED STATES PATENT OFFICE.

JOHN E. THORNTON AND CHARLES F. S. ROTHWELL, OF MANCHESTER, ENGLAND.

POSITIVE PHOTOGRAPHIC FILM.

SPECIFICATION forming part of Letters Patent No. 647,540, dated April 17, 1900.

Application filed July 31, 1899. Serial No. 725,686. (No specimens.)

*To all whom it may concern:*

Be it known that we, JOHN EDWARD THORNTON and CHARLES FREDERICK SEYMOUR ROTHWELL, subjects of the Queen of Great Britain, residing at Manchester, in the county of Lancaster, England, have invented certain new and useful Improvements in Positive Films or Film-Bases, of which the following is a specification.

Hitherto photographic pictures have been obtained by first making a negative upon a suitable flexible or rigid support—such as paper, celluloid, or glass—then developing, fixing, washing, and drying the negative, and afterward making a positive on paper, glass, or other material, which likewise required a number of operations—such as toning, fixing, and washing—before a finished picture was obtained. Moreover, it was necessary to give sufficient exposure to enable printing density to be obtained in the negative.

The object of the invention is to enable finished photographic pictures to be produced in a more direct and rapid manner and with shorter exposures than is possible by the commonly-known methods and to enable positive pictures to be produced direct by developing, fixing, whitening, and washing the colloid sensitized surface that has been exposed in the camera, thus dispensing with all subsequent processes—such as printing, toning and washing—of a positive prepared from a negative. A positive picture thus obtained may at once be mounted in a frame or on a card or other suitable mount. The process will be of great convenience to tourists, travelers, and others, as they may see the finished picture before leaving the scene of operations. Owing to the fact that such a positive image is required only on the surface of the film and very much weaker for viewing by transmitted light than a negative image, which is required or used for printing, a much shorter exposure is necessary to produce a perfect picture—in fact, an exposure of half the duration necessary for the usual processes has been found sufficient by us. This reducing or shortening of the exposure is of great advantage to photographers, as it often occurs that sufficient exposure cannot be obtained under some conditions of light and subject to produce negatives with the existing rapidity of lenses and speed of gelatino-bromid emulsions. It therefore follows that a process by which results are obtained with half the exposure hitherto required will often, under adverse conditions, render good results, where otherwise no results of value would have been obtainable.

This invention consists, essentially, in a photographic receiving film or plate comprising a transparent gelatino-bromid emulsion coated on a black or colored flexible backing—such as black paper, celluloid, or other similar material—which when exposed in the camera is developed and fixed and afterward treated with a whitening solution. The black or colored base forms by its color the dark portions of the picture, the shades and light portions being formed by the varying layers of white colored deposit which form the image. The sensitive coating we find may be very thin, much thinner than is usual in the ordinary process, as by our process the images do not require to be of such an intense nature when developed, as they are further reinforced during the process of whitening the image. For the same reason a shorter exposure may be given in the camera.

In the preparation of the flexible sensitized film or plate it is possible to vary the process of manufacture according to the exact requirements of the user without departing from the principle of the invention.

Figure 2:
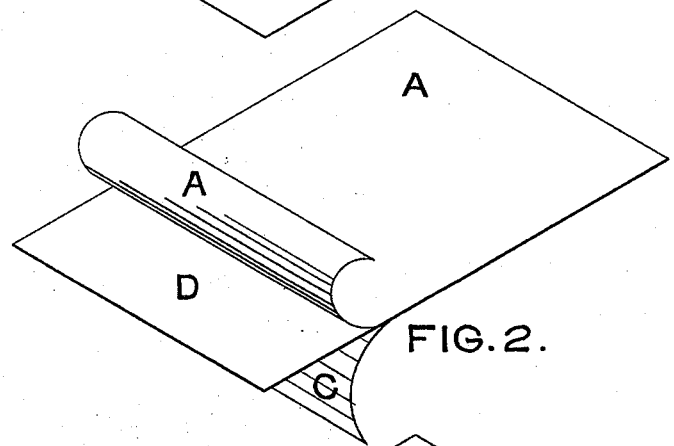
Figure 3:
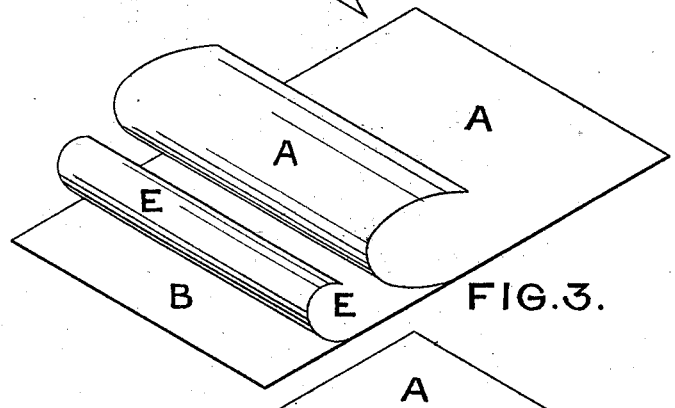
Figure 4:
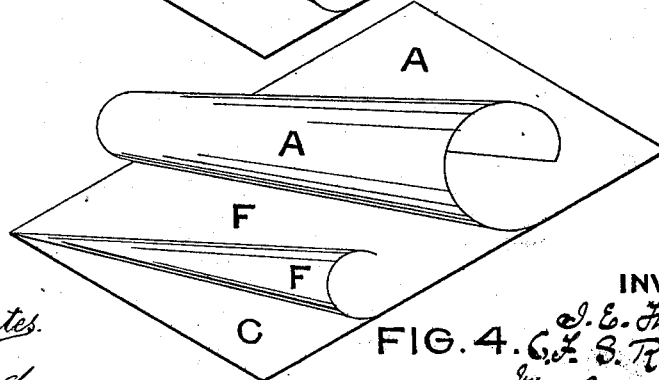

Figure 1 is a perspective view. Fig. 2 is a perspective view showing a modification. Fig. 3 is a perspective view of another modification. Fig. 4 is a perspective view of a further modification.

In its simplest form (see Fig. 1) it is sufficient to coat the sensitive gelatino-bromid emulsion A directly upon the black or colored paper B. In other cases we may use a white or other non-opaque paper C and coat it with a suitably-colored substratum D before applying the sensitive gelatino-bromid emulsion A. Such a suitable substratum D is celluloid, gelatin, or other like substance, with which is incorporated a pigment of suitable color. An advantage of this latter method is that any suitable kind of surface may be given to the paper as a support for the sensitized emulsion.

The surface of the flexible or paper backing may be so hard that the image when developed will not partially "sink" into the pores of the paper. The surface may be very glossy, bright, and smooth, giving the picture similar characteristics, or it may have a grain which will give the picture a mat or dead appearance. It is often desirable to calender the prepared backing before coating with emulsion.

In any case it is important that the sensitive coating shall be on the surface of the black or colored paper backing only and shall not be allowed to penetrate into the pores or substance of the film-base in order to prevent the image upon the exceedingly thin and fine sensitive coating from sinking, as aforesaid, which would otherwise not only give the picture a rough surface, but also a dirty and indistinct appearance, with insufficient contrasts between the high lights and deepest shadows. Therefore the black or colored paper backing B must either be sufficiently waterproof and hard on the surface or otherwise be rendered so with suitable resinous or other varnish E before applying the sensitive emulsion A or where a white paper C is employed to an opaque varnish F. For this reason we prefer to always apply such a varnish E or F unless we use an opaque backing, such as black or colored celluloid or other flexible material that already possesses a sufficiently-hard or non-absorbent surface.

A suitable positive film may be built up as follows: First, black or colored paper backing B, sensitized gelatino-bromid layer; second, paper backing B or C, black or colored waterproof layer D, E, or F, sensitized gelatino-bromid layer A.

Films made according to this invention are conveniently supplied in lengths wound on spools for roll-holders and cameras and by reason of their opaque backing can be loaded into such exposure apparatus in daylight without a dark room. They may also be made in sheets for use in dark slides, magazines, and similar apparatus.

In use the photographer who produces the picture places the sensitized positive film in the camera for exposure, and after an exposure of very short duration the picture is developed by means of any of the ordinary photographic developers, preference being given to those which have little or no staining action upon the film—as, for example, hydroquinone, glycin, or metol. After developing the picture until all the image is clearly seen and of sufficient density or strength it is fixed—that is to say, the unused silver salts are removed—by placing the picture in a solution of sodium thiosulfate of a suitable strength. We find in practice a ten-per-cent. to twenty-per-cent. solution acts well; but it may be stronger or weaker than this. Any other suitable fixer—such as potassium cyanid, for instance—may be used. The fixing solution is afterward removed from the film by washing in the usual way. The film carrying the picture (which is now only just visible) is immersed in a solution composed of mercuric chlorid, with or without the addition of ammonium chlorid, salt, hydrochloric acid, sulfuric acid, or potassium bromid, until the picture is whitened sufficiently. We thus obtain a picture composed of a light deposit on a ground varying in color according to the color of the film-base used.

Instead of using mercuric chlorid we may attain the same end by the use of copper bromid, cupric chlorid, ferric chlorid, or any other chemical which when acting upon the silver image converts it into a white or light-colored condition. After whitening the picture is finally washed and then dried, which latter operation may be assisted by heat if quick drying is required.

We are aware that positive pictures have been made direct in the camera by a sensitized collodion on metal previously prepared with a black varnish; but in the present state of knowledge of the photographic art such a film is too slow for the requirements of modern instantaneous photography and cannot be rolled up on spools, and it is only by combining a gelatino-bromid emulsion with black or colored flexible backing and by whitening the image after development that the necessary requirements of a good, cheap, and instantaneous positive film, which may be wound on rolls or used in flat cut pieces, are fulfilled. This is what our invention renders possible and actually accomplishes, and as such it constitutes a new step or advance in the art of photography.

What we claim as our invention, and desire to protect by Letters Patent, is—

1. A flexible film for the production of direct positive pictures comprising a black or colored flexible backing coated or covered with a layer of gelatino-bromid emulsion, substantially as described.

2. A flexible film for the production of direct positive pictures comprising a colored flexible backing, a waterproof isolating medium coated thereon, and a sensitive layer of gelatino-bromid emulsion, substantially as described.

3. In a flexible film for the production of direct positive pictures the combination with a paper support or backing rendered opaque of a waterproof isolating material and a layer of gelatino-bromid emulsion coated thereon substantially as described.

In witness whereof we have hereunto signed our names in the presence of two subscribing witnesses.

J. E. THORNTON.
C. F. S. ROTHWELL.

Witnesses:
J. OWDEN O'BRIEN,
B. TATHAM WOODHEAD.